Jan. 25, 1966  B. N. HOFFSTROM  3,231,238
TURBINES
Filed June 18, 1964

INVENTOR
BO N. HOFFSTROM

BY Strauch, Nolan & Neale

ATTORNEYS

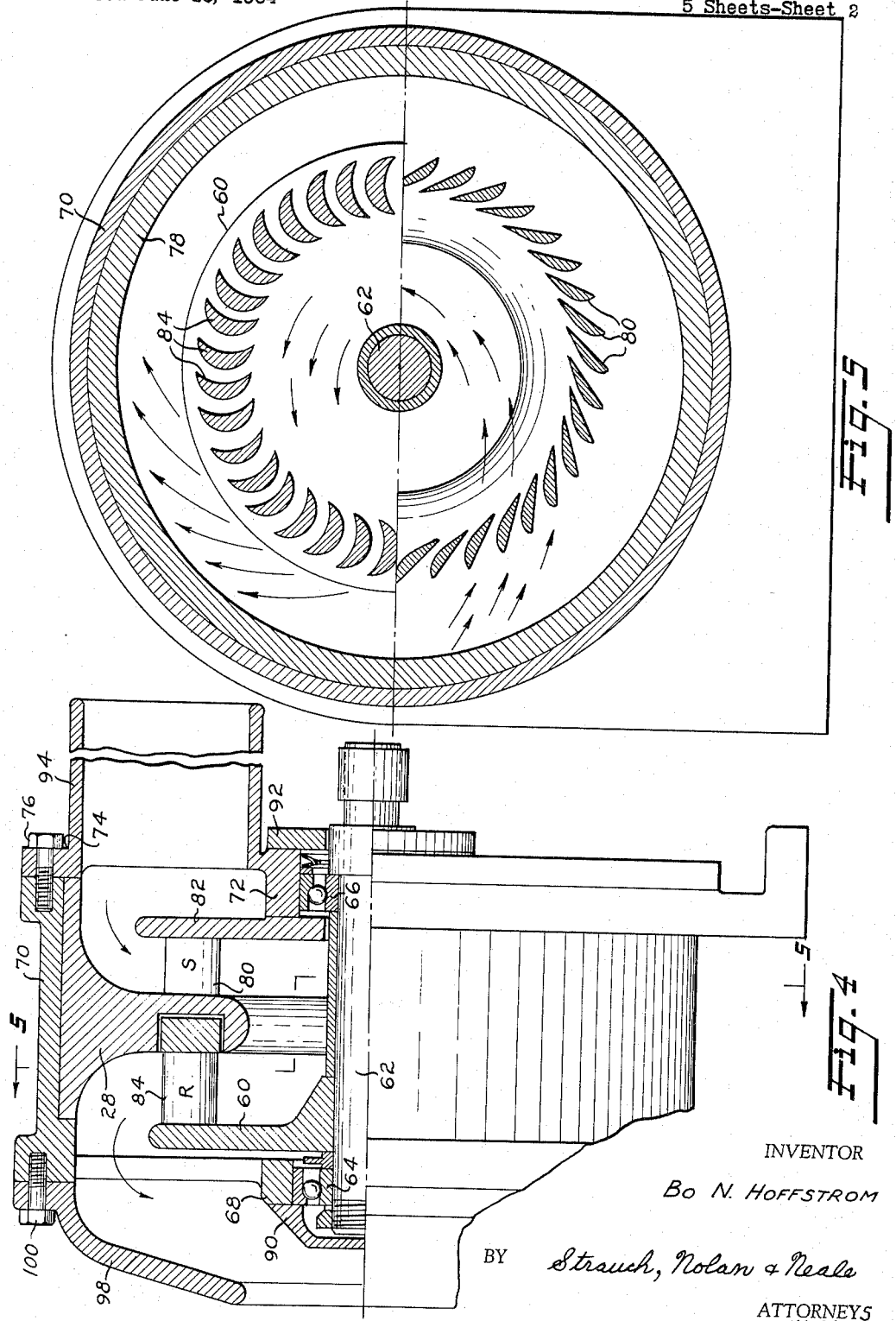

INVENTOR
Bo N. Hoffstrom
BY Strauch, Nolan & Neale
ATTORNEYS

INVENTOR
Bo N. Hoffstrom

United States Patent Office 3,231,238
Patented Jan. 25, 1966

3,231,238
TURBINES
Bo N. Hoffstrom, Los Angeles, Calif. (% Vortec Products Co., 1414 190th St., Torrance, Calif.)
Filed June 18, 1964, Ser. No. 377,459
6 Claims. (Cl. 253—55)

This application is a continuation-in-part of Serial No. 136,520 filed September 7, 1961 for Turbines, now abandoned.

This invention relates to turbines and more particularly to novel turbines having unique torque-speed characteristics.

It has long been believed to be an inherent characteristic of turbine performance that when a turbine is overloaded, its speed decreases and its torque increases. Conversely, a reduction in load is accompanied by an increase in speed and a decrease in torque.

At present all turbine installations are designed with this characteristic in mind. At constant inlet-outlet pressure ratio, turbines designed in accordance with the present state of the art will operate at no load at speeds approximately twice the speed at the design load. Similarly the stall torque of present turbines is almost twice the torque at the design load.

Substantial departures from rated load thus may produce dangerous overspeeding, undesirable torque variations, and may prevent proper operation of the apparatus driven by the turbine. In recognition of these difficulties many turbines incorporate elaborate governor systems to provide speed control or torque regulators to provide torque control. These systems are in general sluggish in function, complex and expensive, and result in increased maintenance costs.

In accordance with the present invention the desired controls are directly effected by unique turbine construction rather than indirectly by control accessories.

The turbines of the present invention are based on a novel application of certain characteristics and phenomena of rotary flow of fluid in circular and spiral paths. The term "rotary flow" as used herein refers to two basic types of fluid flow which may be termed "rotational flow" and "circulatory flow." In rotational flow all fluid particles have the same angular velocity, and velocity distribution is the same as that of particles in a solid flywheel. In circulatory flow the tangential velocity is inversely proportional to radius. A complete vortex contains both rotational flow and circulatory flow. These flows are concentric with a boundary between them. The portion of the vortex inside the boundary is called the core. In this area rotational flow is present. Outwardly of the boundary in the portion of the vortex which may be called the whirl, circulatory flow is present.

Although the mechanical components of rotary flow machines such as turbines are highly developed, the prior design and construction of turbines reflects little, if any, appreciation of rotary flow phenomena. As a result, attempts are often made to avoid rotary fluid flow in rotary machines so that only the mechanical components rotate.

With the foregoing considerations in mind it is the principal purpose and object of the present invention to provide novel turbines in which phenomena of rotary flow is utilized in a novel manner to provide widely varying torque-speed curves from constant torque to constant speed.

It is a further object of the present invention to provide novel turbines which operate with widely varying torque-speed characteristics without the addition of moving parts or accessories.

It is a further object to provide mechanically uncomplicated inexpensive means for establishing any one of a number of torque speed performance characteristics in turbines.

It is also an object of the present invention to provide novel turbines incorporating speed limiting means which do not include moving parts and which are fully automatic.

It is an additional object of the present invention to provide improved devices for automatically preventing turbine overspeed with no loss of performance at design point conditions.

In attaining these and other objects the present invention provides means for utilizing, in a unique manner, the build-up of rotary flow in the operating fluid in the region between the downstream side of the turbine blades and the aperture through which the fluid leaves the turbine.

As is well known in the art, when turbines are operating at the design point, i.e., at the torque-speed relation for which they were designed to produce maximum power, the operating fluid leaves the turbine blades with no rotary velocity. At off design conditions the fluid leaves the turbine blades in a rotary flow pattern, the tangential velocity of which is a function of the degree of departure from the design conditions reaching a maximum when the turbine is stalled or when the turbine is operating at no load.

I have discovered that this rotary flow phenomenon which prior turbine designs have attempted to eliminate in so far as possible can be effectively utilized to provide an automatic control of off design torque patterns and maximum turbine speeds. More specifically, in accordance with the present invention the off design torque and turbine speed are set up and controlled (for a given applied pressure) by the relative amount of opening through the turbine blades and the exit ring and by the ratio of the mean turbine blade diameter to the diameter of the turbine exit ring.

Additional objects and advantages will become apparent as the description proceeds in connection with the accompanying drawings in which:

FIGURE 4 is a central vertical half section of a centrifugal flow turbine constructed in accordance with the present invention;

FIGURE 5 is a section taken along line 5—5 of FIGURE 4;

FIGURE 7 is a transverse section taken along line 7—7 of FIGURE 6;

Figure 8:
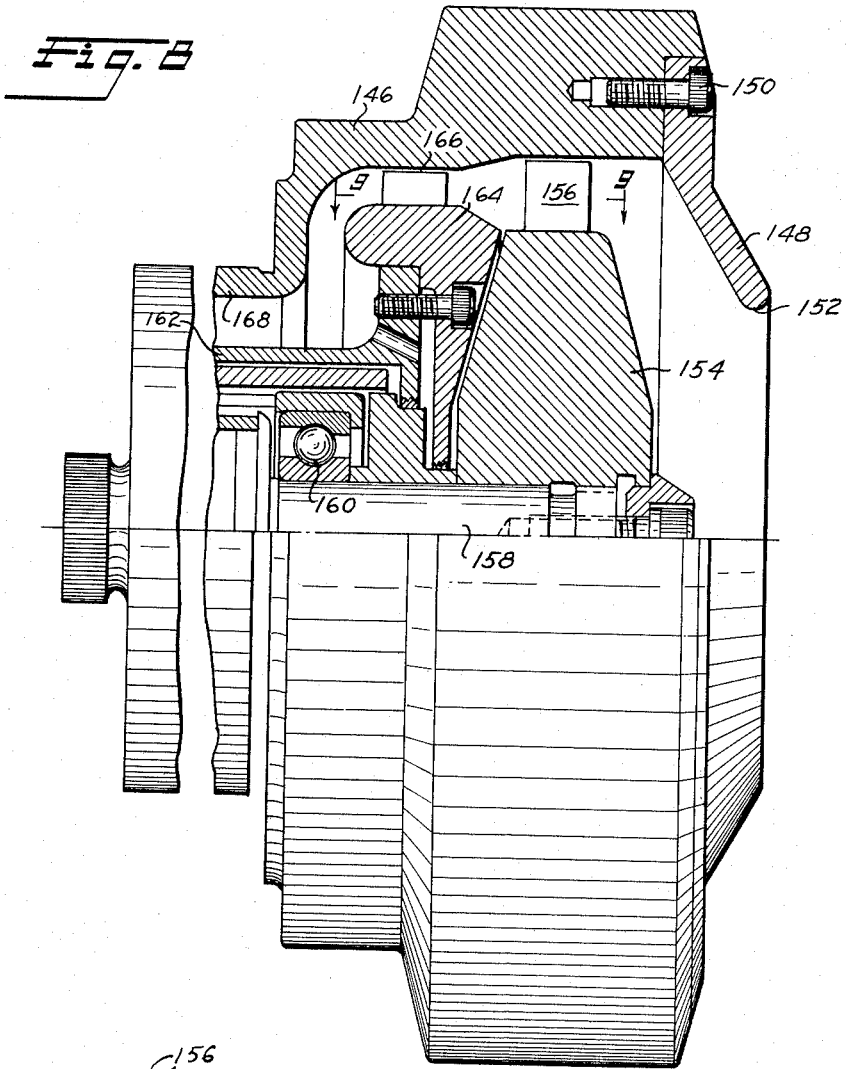
FIGURE 8 is a central vertical half section of an axial flow turbine constructed in accordance with the present invention.

The present invention may be applied to turbines of any size intended for operation at any desired physically obtainable speed. For example, the turbine shown in FIGURES 7 and 8 is specifically constructed for operation at 200,000 r.p.m. The other forms of the turbine are intended for operation at speeds of from 20,000 to 30,000 r.p.m. Any fluid can be used as the working medium.

Figure 1:
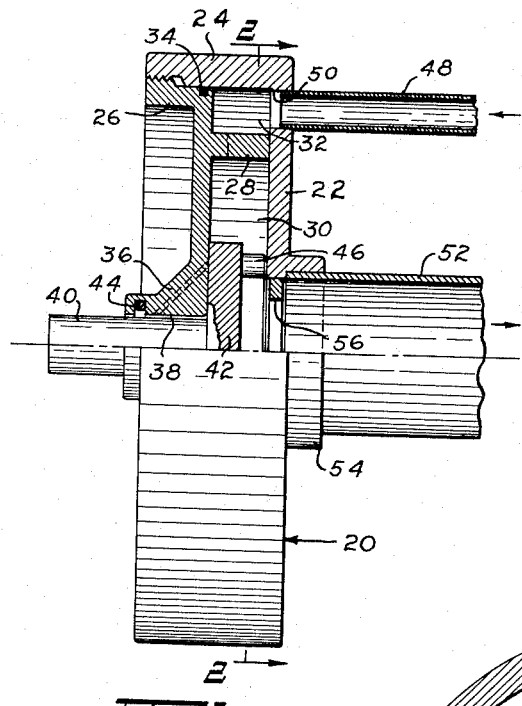
FIGURE 1 is a central vertical section of a centripetal flow impulse turbine embodying the present invention.
Figure 2:
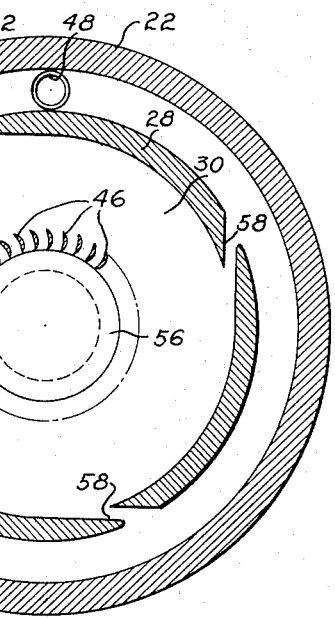
FIGURE 2 is a transverse section taken along the line 2—2 of FIGURE 1.

Referring now more particularly to the drawings, the impulse turbine illustrated in FIGURES 1 and 2 comprises a main body member 20 having a radial wall 22 and an axially extending wall 24. A back wall member 26 is threaded into the main body 20 to press the free edge of a nozzle ring section 28 into tight engagement with the inner surface of the wall 22. The ring 28 forms with the main body member 20 an annular inner whirl chamber 30 and a outer nozzle chamber 32, the latter being sealed by an O-ring 34. At its center the rear wall member 26 has a flange 36 provided with a through bore 38 which forms a bearing surface for the shaft 40 of a rotor assembly 42. The outer end of the bearing surface 38 is sealed by an O-ring 44. Adjacent its outer periphery the rotor assembly 42 carries a plurality of C-shaped blades 46 which extend into close clearance relation with the inner surface of the wall 22 of the main body member.

An inlet conduit 48 for the operating fluid is received in an opening 50 in the body member 20 leading into the chamber 32. An outlet or exhaust conduit 52 is received in a flange 54 formed concentrically with the axis of the rotor shaft 40. Interposed between the inner end of the output conduit 52 and the rotor blades 46 is an exit ring 56 which may be formed integrally with the wall portion 22 or may be mounted to permit its detachment and replacement.

In operation, fluid which may be liquid or gas is supplied under pressure to the inlet conduit 48 and passes into the nozzle chamber 32. The fluid passes through a number of tangential inlet slots 58 (4 shown) formed in the nozzle ring 28 into the whirl chamber 30. Since in the whirl chamber the flow is circulatory, the initial tangential velocity, $V_t$ increases as the fluid spirals toward the blades 46 and reaches a final maximum velocity $V_0$ just before striking the blades when the turbine is operating at the design point. When the fluid reaches the outer periphery of the ring of rotor blades 46, all available potential energy exists in the form of kinetic energy. The rotor blades then transfer this kinetic energy from the fluid to the rotor. If the tangential velocity of the fluid immediately before striking the rotor blades is, $V_0$, and if the rotor is running with a peripheral speed of $\frac{1}{2} V_0$ (design point conditions) the fluid will enter the exit passage 52 with substantially zero tangential velocity, all of its energy having been absorbed by the rotor.

If, in a conventional turbine, the load is reduced to zero the rotor will assume approximately the same peripheral velocity $V_0$ as the fluid, i.e., the rotor will rotate at double its design speed. Conversely, when the load on the conventional turbine is doubled the rotor will stall. In both of these extreme cases fluid will leave the inner edges of the turbine blades with tangential velocity $V_0$. In the case of operation at no load the fluid leaving the blades will rotate in the same direction as the fluid entering the blades. Conversely, when the rotor is stalled, the direction of the rotation of the fluid will be reversed by the then stationary rotor blades.

I have discovered that by the use of an exit ring through which the fluid leaves the turbine and by correlation of the size of the ring and the total flow area through the blades, the basic characteristics of turbines may be altered to produce operating characteristics never before achieved in the art. Specifically, I have discovered that in an ideal impulse turbine having blades of zero radial length, if the radius of the exit opening formed by the exit ring 56 is such that the core radius formed at zero torque or with stationary rotor is $\frac{1}{2}$ the blade radius, the turbine will then operate at approximately constant torque below rated r.p.m. and at approximately constant r.p.m. below rated torque. A family of torque speed curves for a specific turbine can be obtained by variation in size of the exit opening formed by exit ring 56.

At full load the exit ring 56 should not restrict flow, at the same time the opening formed by the exit ring must be substantially smaller than mean blade diameter.

In a practical case, in a turbine having finite blade dimisions, these ideal results can be closely approached.

Figure 3:
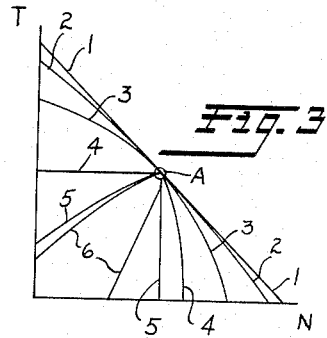
FIGURE 3 is a diagram illustrating typical torque speed curves for prior art turbines and the turbines of the present invention.

Typical performance curves are shown in FIGURE 3 in which torque is plotted against r.p.m. In this figure, A is the design point, i.e., the combination of torque and speed at which the turbine produces highest power. Line 1 is the theoretical torque-speed relation of a conventional turbine. Line 2 illustrates the same relation as it might actually appear for a turbine according to current practice prior to the present invention. Lines 3 through 6 are examples of torque-speed curves obtainable in the turbines of the present invention. Line 5 shows one particularly valuable application of the invention and illustrates the performance of a turbine constructed in accordance with the present invention which operates at substantially constant r.p.m. from zero to the design point. Line 4 illustrates another particularly valuable application of the invention and illustrates a case where the turbine will produce substantially constant torque from zero r.p.m. to rated r.p.m. The torque-speed curves of FIGURE 3 are applicable to any turbine, i.e., an axial flow turbine, centripetal flow turbines, centrifugal flow turbines and mixed flow turbines. All of these turbines will respond in the same manner to the application of the principles of the present invention.

At the design point the size of the exit opening is not critical, it only being necessary that the area of the exit opening be large enough so that it does not appreciably restrict the fluid flow. It is common practice to design turbines for high volumetric flow relative to size. Thus, in a turbine of conventional design, any reduction in exit diameter may merely reduce the effective pressure ratio over the turbine blades by raising the back pressure. In accordance with the present invention this is avoided by reducing the flow area through the blades either by reducing their length or by utilizing a number of relatively thick blades to effectively reduce the total area of the fluid passageway formed between the blades.

At a given off design condition, the fluid leaving the turbine has angular momentum and flows in a rotary path and establishes a vortex, the radius of the core boundary being determined by the exit ring. The ring also controls the tangential velocity of the fluid passing through the ring, the smaller the ring the greater the velocity.

For any given velocity at the core boundary, the angular momentum of particles of any point in the vortex is a function of the core diameter and mass flow but independent of the distance of the particles from the core.

A reduction in core diameter reduces the angular momentum due to inherent operation of the vortex. A reduction in core diameter also reduces the mass flow producing an additional reduction in angular momentum. The quantitative change is susceptible to mathematical calculation.

Thus, angular momentum of the fluid leaving the rotor blades can be controlled by control of the core radius which is in turn a function of the diameter of the exit ring. Accordingly, the rotor torque which is a function of angular momentum at off design conditions (which produce rotary exit flow) can be controlled by control of the core radius which is in turn controlled by the size of the exit ring. For example, stalled rotor torque may be made equal to, smaller or larger than the rated torque by varying the size of the exit opening. The exact size of the exit opening can be determined by mathematical analysis. It can also be determined imperically, once the basic principles of the operation of rotary flow, its relation to angular momentum, and the relationship of angular momentum to torque are understood.

By similar analysis the turbine can be made to operate at constant r.p.m. from zero torque (idling rotor) to full design torque. At no load the rotor speed equals the rotary velocity of the fluid, the angular momentum of which does not change as it passes through the rotor blades. Since angular momentum is function of velocity, control of the angular momentum in accordance with the foregoing discussion also produces control of the velocity of the fluid and control of rotor r.p.m. I have also discovered that if the size of the exit aperture, as determined in accordance with the present invention, produces a rotor speed at no load which is equal to a rotor speed at full load, the rotor speed at intermediate loads will also have essentially the same value, i.e., the turbine will provide substantially constant speed operation at all loads from zero to the full design load.

In conventional turbines the radius $R_e$ of the passage through which the motive fluid exits from the turbine is at least equal to the mean blade radius $R_b$. Accordingly, the rotary flow phenomenon developed when the conventional turbine operates at off design conditions produces no significant control of the turbine torque-speed curve.

In the turbines of the present invention, this ratio $R_b/R_e$ is substantially greater than one. For example, in a typical impulse turbine constructed in accordance with the present invention the ratio $R_b/R_e$ will be between 1.2:1 and 2.0:1 depending upon the particular performance characteristics desired. For example, as shown in FIGURE 3, a ratio of 2:1 produces substantially constant speed performance between full load and zero load. On the other hand, the ratio between 1.2:1 and 1.5:1 will provide the type of control under which a stall torque of the turbine is substantially equal to its design point torque. It is now believed that the desired turbine performance, i.e., substantially constant torque or substantially constant speed can be obtained in most turbines by employing a ratio $R_b/R_e$ between 1.2:1 and 2.0:1.

FIGURES 4 and 5, to which detailed reference will now be made, illustrates a centrifugal flow impulse turbine constructed in accordance with the present invention. In this form of the invention the rotor assembly 60 is keyed to a rotor shaft 62 supported by bearings 64 and 66. The bearing 64 is supported in a hub 68 carried by the main casing member 70 while the bearing 66 is supported in a hub member 72 carried by an end plate 74 which is secured as by bolts 76 to the casing assembly 70. Clamped between a shoulder and casing assembly 70 and a similar shoulder on end plate 74 is an annular divider ring 78 to which stator blades 80 carried by a ring 82 are cemented or otherwise suitably secured. A series of C-shaped rotor blades 84 are carried by the rotor member 60, the outer ends of the rotor blades being joined by a ring 86 fitted within an annular groove 88 in the divider plate 78. Caps 90 and 92 are suitably secured to the hubs 68 and 72 respectively, to enclose the rotor bearings. Fluid is supplied to the turbine to an inlet conduit 94 extending through end plate 74 and fluid exits from the turbine through an opening 96 formed by the inner periphery of an exit ring member 98 secured by bolts 100 to the casing assembly 70.

In operation, fluid under pressure supplied through the conduit 94 passes through the inclined stator vanes 80 which impart a rotational velocity to the body of fluid in a counterclockwise direction as viewed in FIGURE 5. The fluid then passes through the oppositely facing rotor vanes 80. At design load the change in angular momentum of the fluid as it passes through the rotor vanes is such that the fluid leaves the rotor blades with zero rotational velocity and passes out of the turbine through the exit opening 96. At idling rotor, i.e., when no load is applied to shaft 62, the angular velocity of the vanes 80 is the same as the angular velocity of the fluid. The fluid passes through the vanes without change in angular momentum and continues to rotate in a counterclockwise direction as viewed in FIGURE 5 and establishes a vortex flow within the end plate 98 and eventually passes out through the opening 96. Under locked rotor conditions the fluid is reversed as it passes through the then stationary vanes 80 and passes into the region enclosed by the end plate 98 whirling in a clockwise direction as viewed in FIGURE 5.

The performance of this turbine is essentially the same as the turbine of FIGURES 1 and 2.

Figure 6:
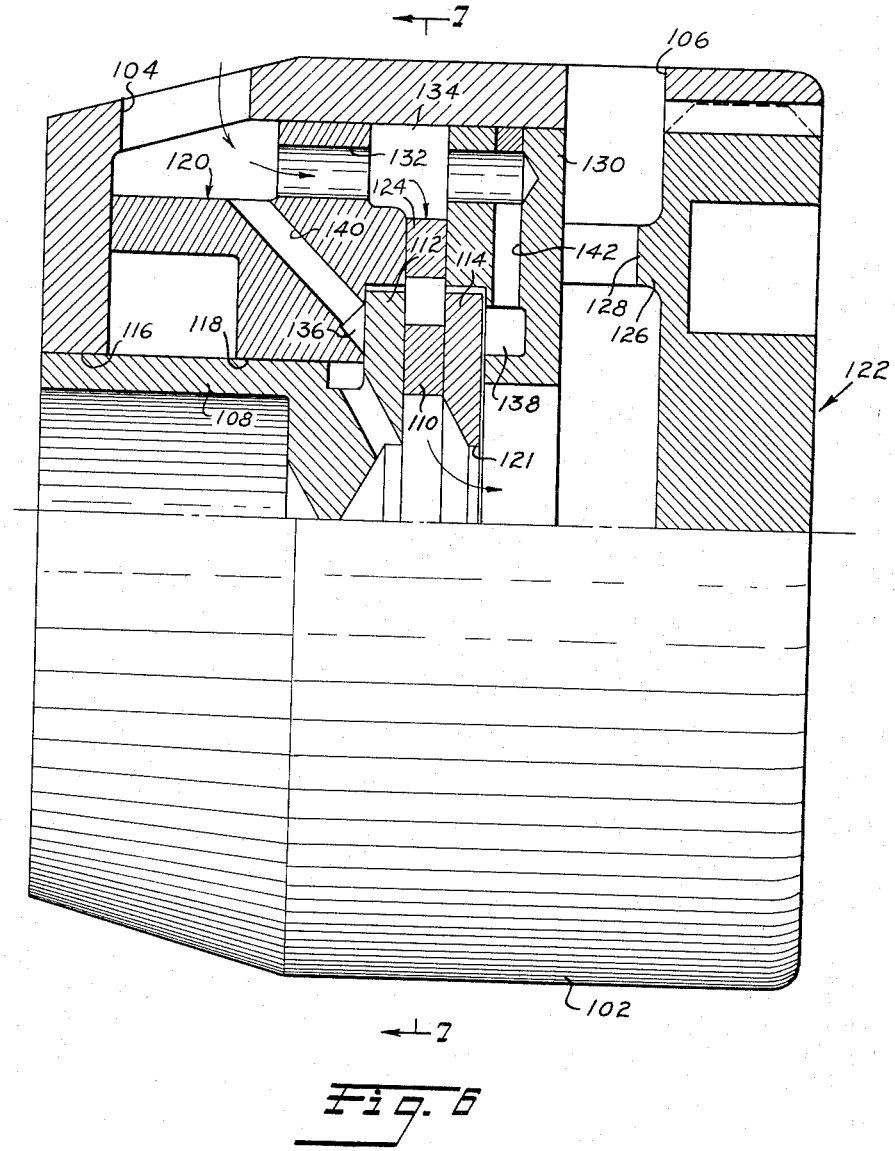
FIGURE 6 is a vertical central half section of a centripetal flow turbine constructed in accordance with the present invention.
Figure 1:
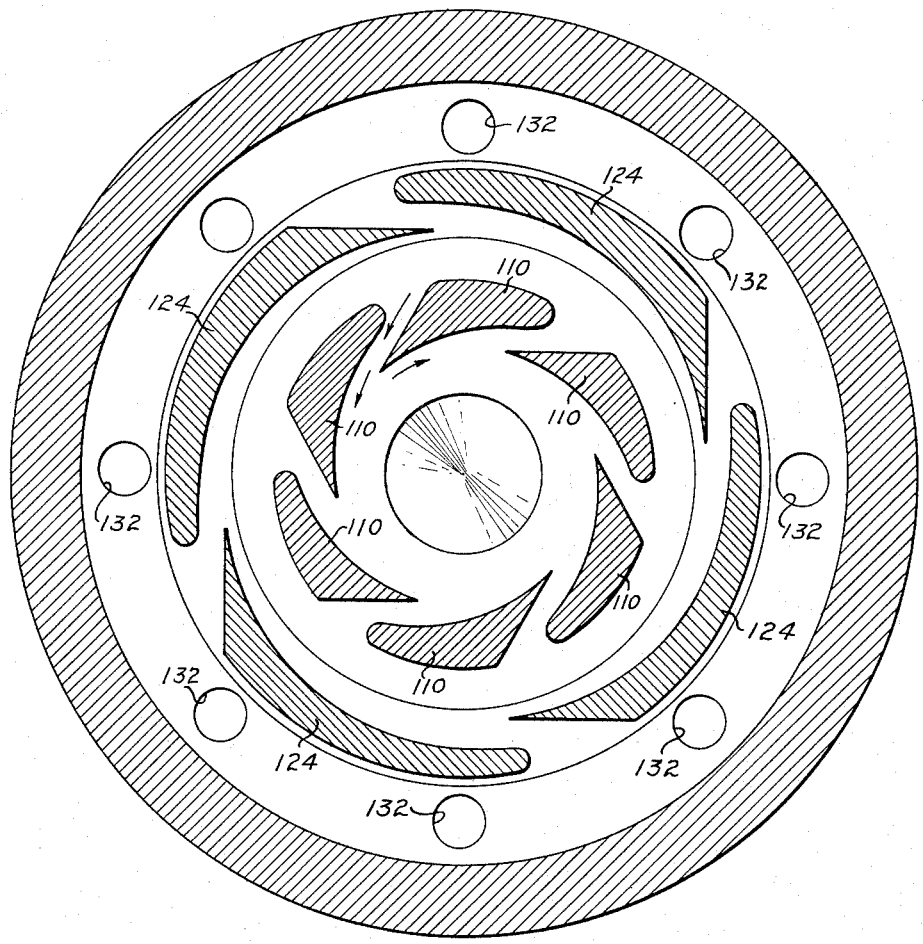

FIGURES 6 and 7 illustrate a turbine designed for very high-speed operation, for example, 200,000 r.p.m. This turbine, which is of very small dimensions, for example 1/3 inch in diameter, is particularly suitable for use of a very high-speed power source for a dental drill.

In this form of the invention the turbine is enclosed in a dish-shaped casing 102 having a radial inlet opening 104 and a radial outlet opening 106. A rotor shaft 108 carrying rotor vanes 110 between a pair of radial plates 112 and 114 is rotatably supported on a plain bearing surface 116 formed in the housing 102 and a plain bearing surface 118 formed by a central bore of a sleeve assembly 120. The inner periphery of plate 114 forms the exit opening 121. The sleeve assembly is held in position against the bottom wall of the housing 102 by an end plate assembly 122 threaded into the outer end of the housing 102. Milled from or cemented to the ring assembly 120 are a plurality of stator vanes 124 positioned in the plane of the rotor vanes 110. The end plate assembly 122 carries a circumferential web 126 provided with a plurality of outlet openings 128 and an inner ring 130 which closely surrounds the rotating plate 114 and abuts tightly against the outer edge of the rotor vanes 124.

The ring assembly 120 is provided with a plurality of circumferentially spaced axially extending passages 132 through which inlet fluid flows into the chamber 134 formed around the outer periphery of the stator vanes 124. Pockets 136 and 138 are formed at the opposite sides of the rotor assembly and fluid under pressure is fed to these pockets through respective passages 140 and 142, the fluid being bled from these passages through clearance spaces at the outer sides of the plates 112 and 114 to the low pressure side of the turbine. The pockets provide an automatic balancing feature.

In operation of fluid, for example, water under pressure is supplied through the inlet 104 and passes to the outer periphery of the stator vanes 124. Fluid then passes through the opening between the adjacent ends of the stator vanes and is caused to rotate in a clockwise direction as viewed in FIGURE 7. As the fluid spirals toward the exit opening 121, it impinges on the rotor vanes 110 causing these vanes to rotate in a clockwise direction. At design load the change in angular momentum of the fluid as it passes between the rotor blades is such that it leaves the inner edges of the rotor blades with zero circumferential velocity and passes out through the opening 121 with pure axial motion. When the rotor is locked against rotation, the rotation of the fluid is reversed as it passes between the rotor vanes and it passes toward the core of the vortex with a rotary velocity equal to the inlet rotary velocity. When the rotor is permitted to idle, i.e., under conditions of zero torque, speed of the rotor is essentially the same as that of the fluid which thus experience no change in angular momentum.

The torque-speed characteristics of this turbine can be made the same as the corresponding characteristics of the turbines discussed above.

Figure 9:
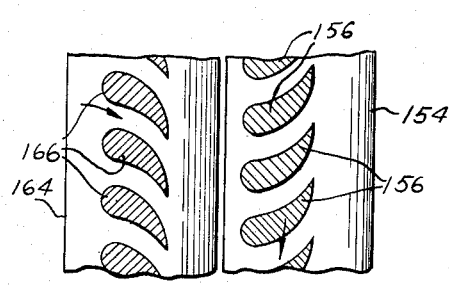
FIGURE 9 is a fragmentary section taken along line 9—9 of FIGURE 8.

FIGURES 8 and 9 illustrate an axial flow reaction turbine constructed in accordance with the present invention. In this form of the invention the turbine comprises a dish-shaped casing 146 to which an end plate 148 is secured as by screws 150, the end plate having an exit opening 152. A rotor 154 carrying rotor vanes 156 is suitably supported on a rotor shaft 158 carried by a bearing 160 and additional bearings not shown. The sleeve 162 non-rotatably secured to the casing 146 by means not shown carries a stator member 164, the outer periphery of which carries a plurality of stator vanes 166. The casing is provided with one or more axially extending fluid inlet passages 168. In operation to working fluid under pressure is introduced through the passage 168 and flows axially to the stator vanes 166 which, because of their inclination, direct the fluid circumferentially of the turbine. The fluid then flows through the passages between the rotor vanes 165 and out through the exit opening 152. At design load the change in angular momentum of the fluid as it progresses through the rotor vanes is such that it leaves the apparatus with no rotational velocity. When the rotor is locked against rotation, the rotor vanes reverse the direction of rotation of fluid and when the rotor is idling there is no change of angular momentum in the fluid body and it leaves the exit side of the rotor vanes without change of rotary velocity. At idling rotor the angular velocity of the rotor is the same as that of the fluid.

The invention may be embodied in other specific forms without departing from the spirit or essential characteristics thereof. The present embodiments are therefore to be considered in all respects as illustrated and not restrictive, the scope of the invention being indicated by the appended claims rather than by the foregoing description, and all changes which come within the meaning and range of equivalency of the claims are therefore intended to be embraced therein.

What is claimed and described to be secured by Letters Patent is:

1. A turbine comprising a housing having an annular working chamber, means providing a fluid inlet communicating with said working chamber, means to cause fluid which enters said inlet to move in a rotary path in said working chamber, a shaft rotatably mounted in said housing, rotor means carried by said shaft for rotation in said working chamber and providing a plurality of passages positioned to interact with said fluid to impart a driving force to said rotor, and a ring forming an exhaust opening for said fluid coaxially of said shaft, said exhaust opening being circular, the diameter of said exhaust opening being substantially less than but at least half the mean diameter of the rotor passages, and the diameter of said exhaust opening being sufficiently large to accommodate, without substantial restriction, the amount of fluid flowing through said rotor passages when said fluid leaves said rotor passages with no rotation.

2. A turbine comprising a housing having an annular working chamber, means providing a fluid inlet communicating with said working chamber, a plurality of stator vanes in said working chamber to cause fluid entering said inlet to move in a rotary path in said working chamber, a shaft rotatably mounted in said housing, rotor means carried by said shaft for rotation in said working chamber providing a plurality of passages positioned to interact with said fluid and impart a driving force to said rotor, and a ring forming an exhaust opening for said fluid coaxially of said shaft, said exhaust opening being circular, the diameter of said exhaust opening being substantially less than but a least half the mean diameter of said rotor passages, and the diameter of said exhaust opening being sufficiently large to accommodate, without substantial restriction, the amount of fluid flowing through said rotor passages when said fluid leaves said rotor passages with no rotation.

3. A turbine comprising a housing having an annular working chamber, means providing a fluid inlet communicating with said working chamber, a plurality of stator vanes in said working chamber to cause fluid entering said inlet to move in a rotary path in said working chamber, a shaft rotatably mounted in said housing coaxially of said working chamber, a plurality of rotor vanes carried by said shaft for rotation in said working chamber and positioned to intercept said fluid and be driven thereby, and a ring carried by said housing forming an exhaust opening for said fluid coaxially of said shaft, said exhaust opening being circular, the diameter of said exhaust opening being substantially less than but at least half the mean diameter of said rotor vanes and the diameter of said exhaust opening being sufficiently large to accommodate, without substantial restriction, the amount of fluid flowing through said rotor vanes when said fluid leaves said rotor vanes with no rotation.

4. A turbine comprising a housing having an annular working chamber, means providing a fluid inlet communicating with said working chamber, flow directing means to cause fluid entering said inlet to move in a rotary path in said working chamber, a shaft rotatably mounted in said housing coaxially of said working chamber, a plurality of rotor vanes carried by said shaft for rotation in said working chamber, said rotor vanes being concentric with said flow directing means and in essentially the same radial plane as said flow directing means and disposed radially inward of said flow directing means and positioned to intercept said fluid and be driven thereby, and a ring carried by said housing forming an exhaust opening for said fluid coaxially of said shaft, said exhaust opening being circular, the diameter of said exhaust opening being substantially less than the mean diameter of said rotor vanes, and the total area of the passages through said rotor vanes being sufficiently small to limit the flow therethrough to the amount which can be accommodated without substantial restriction by said exhaust opening when said fluid leaves the inner periphery of said rotor blades with no rotation.

5. A turbine comprising a housing having an annular working chamber, means providing a fluid inlet communicating with said working chamber, a plurality of stator vanes in said working chamber to cause fluid entering said inlet to move in a rotary path within said working chamber, a shaft rotatably mounted in said housing coaxially with said working chamber, a plurality of rotor vanes carried by said shaft for rotation in said working chamber, the mean diameter of said rotor vanes being essentially the same as mean diameter of said stator vanes, an annular divider carried by said housing between said rotor vanes and said stator vanes around which fluid flows from said stator vanes to said rotor vanes, said rotor vanes being positioned to intercept said fluid and be driven thereby, and a ring carried by said housing forming an exhaust opening for said fluid coaxially of said shaft, said exhaust opening being circular, the diameter of said exhaust opening being substantially less than the mean diameter of said rotor vanes, and the total area of the passages through said rotor vanes being sufficiently small as to limit flow therethrough to the amount which can be accommodated without substantial restriction by said exhaust opening when said fluid leaves said rotor vanes with no rotation.

6. A turbine comprising a housing having an annular working chamber, means providing a fluid inlet communicating with said working chamber, a plurality of stator vanes in said working chamber to cause fluid entering said inlet to move in a rotary path in said working chamber, a shaft rotatably mounted in said housing coaxially of said working chamber, a plurality of rotor vanes carried by said shaft for rotation in said working chamber, said rotor vanes being positioned in side-by-side relation with said stator vanes and the area between said rotor vanes and said stator vanes being unobstructed, said rotor vanes being positioned to intercept the rotating fluid issuing from said stator vanes and be driven thereby, and a ring carried by said housing forming an exhaust opening for said fluid coaxially of said shaft, said exhaust opening being circular, the diameter of said exhaust opening being substantially less than but at least half the mean diameter of said rotor vanes and the diameter of said exhaust opening being sufficiently large to accommodate, without substantial restriction, the amount of fluid flowing through said rotor vanes when said fluid leaves said rotor vanes with no rotation.

(References on following page)

References Cited by the Examiner

UNITED STATES PATENTS

| | | | |
|---|---|---|---|
| 1,328,835 | 1/1920 | Kasley | 230—125 |
| 1,722,158 | 7/1929 | Reiffenstein | 253—158 |
| 1,858,043 | 5/1932 | Glass | 253—2 |
| 2,165,994 | 7/1939 | Zerkowitz | 253—134 X |
| 2,204,169 | 6/1940 | Zerkowitz | 253—55 X |
| 2,374,671 | 5/1945 | Dupont | 253—87 |
| 2,492,672 | 12/1949 | Wood | 253—55 X |
| 2,715,814 | 8/1955 | Barr | 230—125 |
| 2,911,138 | 11/1959 | Birmann | 253—55 X |
| 2,923,526 | 2/1960 | Street | 253—52 |
| 3,073,114 | 1/1963 | Wood | 253—55 X |

FOREIGN PATENTS

| | | |
|---|---|---|
| 200,731 | 1/1956 | Australia. |
| 1,067,496 | 1/1954 | France. |
| 163,522 | 5/1921 | Great Britain. |
| 301,684 | 10/1932 | Italy. |

DONLEY J. STOCKING, *Primary Examiner.*

HENRY F. RADUAZO, *Examiner.*